(12) United States Patent
Malpier et al.

(10) Patent No.: US 7,584,680 B2
(45) Date of Patent: Sep. 8, 2009

(54) MULTI-SPEED, FORWARD-REVERSE TRANSMISSION

(76) Inventors: Michael A Malpier, 2124 Newcastle Ave., Westchester, IL (US) 60154; Don B. Blasing, 151 26 W. 147th St., Homer Glen, IL (US) 60491

( * ) Notice: Subject to any disclaimer, the term of this patent is extended or adjusted under 35 U.S.C. 154(b) by 423 days.

(21) Appl. No.: 11/412,498

(22) Filed: Apr. 27, 2006

(65) Prior Publication Data

US 2007/0251344 A1 Nov. 1, 2007

(51) Int. Cl.
*F16H 3/02* (2006.01)
(52) U.S. Cl. .......................................... 74/335; 74/330
(58) Field of Classification Search .................... 74/325, 74/329, 332
See application file for complete search history.

(56) References Cited

U.S. PATENT DOCUMENTS 6,865,964 B2 * 3/2005 Miller et al. .................. 74/329
7,021,168 B2 * 4/2006 Burkle et al. ................. 74/325
2006/0048593 A1 * 3/2006 Gumpoltsberger et al. .... 74/325

* cited by examiner

*Primary Examiner*—Charles A Marmor
*Assistant Examiner*—Edwin A Young

(57) ABSTRACT

A transmission comprises an input shaft, an output shaft assembly, cylinder arm assemblies; and a rod-translation system. The input shaft comprises opposing input shaft ends, a rotation transmissive portion, and an axis of rotation. The transmissive portion extends intermediate the input shaft ends for transferring engine-originated rotational motion to the transmission assembly. The arm assemblies are concentric about the axis of rotation and comprise opposing arm ends, and an inner arm diameter. First arm ends are each independently geared to the transmissive portion via the inner arm diameters. The output shaft assembly comprises a stepped ring and an output shaft. The rod-translation system functions to translate a series of rods intermediate an arm-engaged position and an arm-disengaged position. First rod ends engage an output arm end when in the arm-engaged position for imparting rotational movement from the output arm end to the output shaft via the stepped ring.

20 Claims, 19 Drawing Sheets

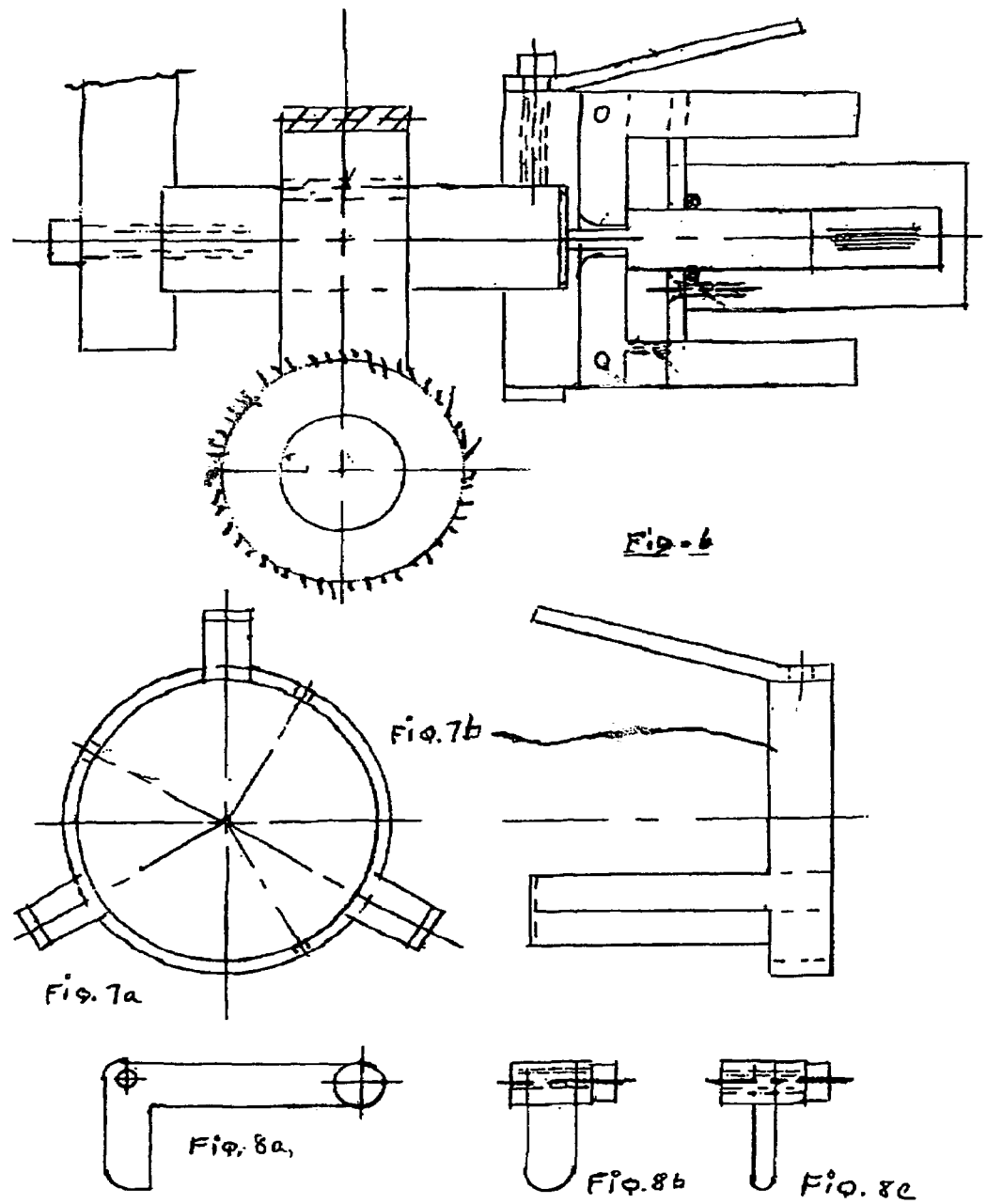

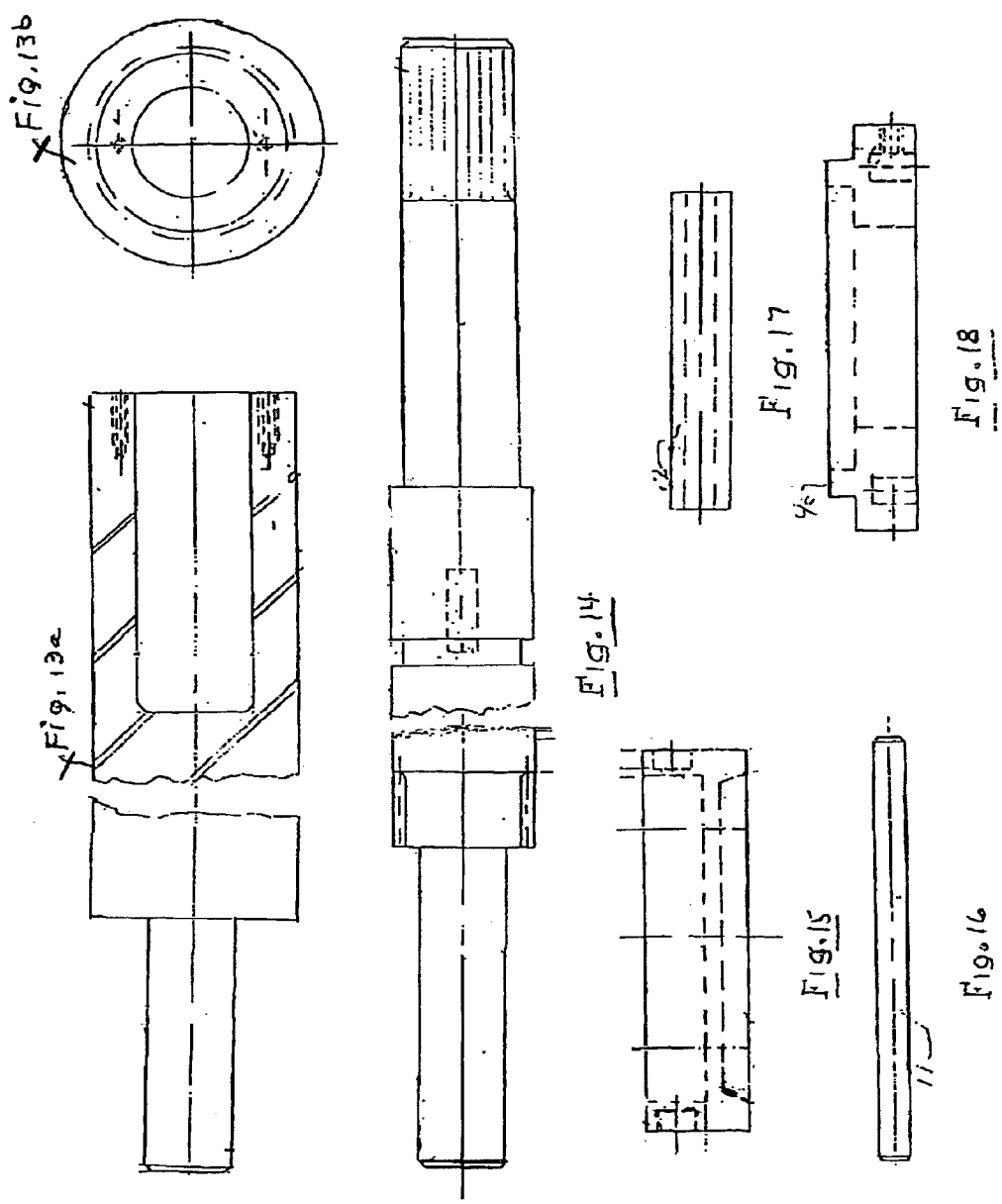

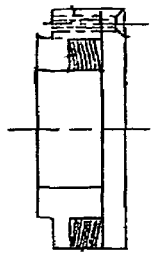
Fig. 19
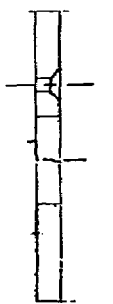
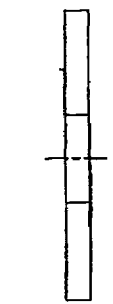
Fig. 20   Fig. 21   Fig. 22
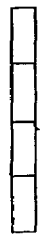
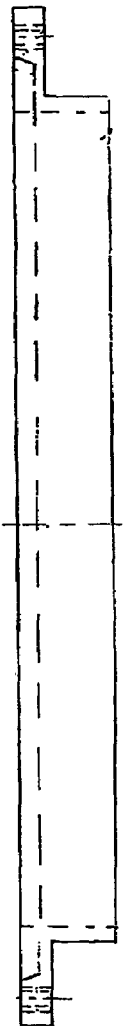
Fig. 23   Fig. 24   Fig. 25   Fig. 26

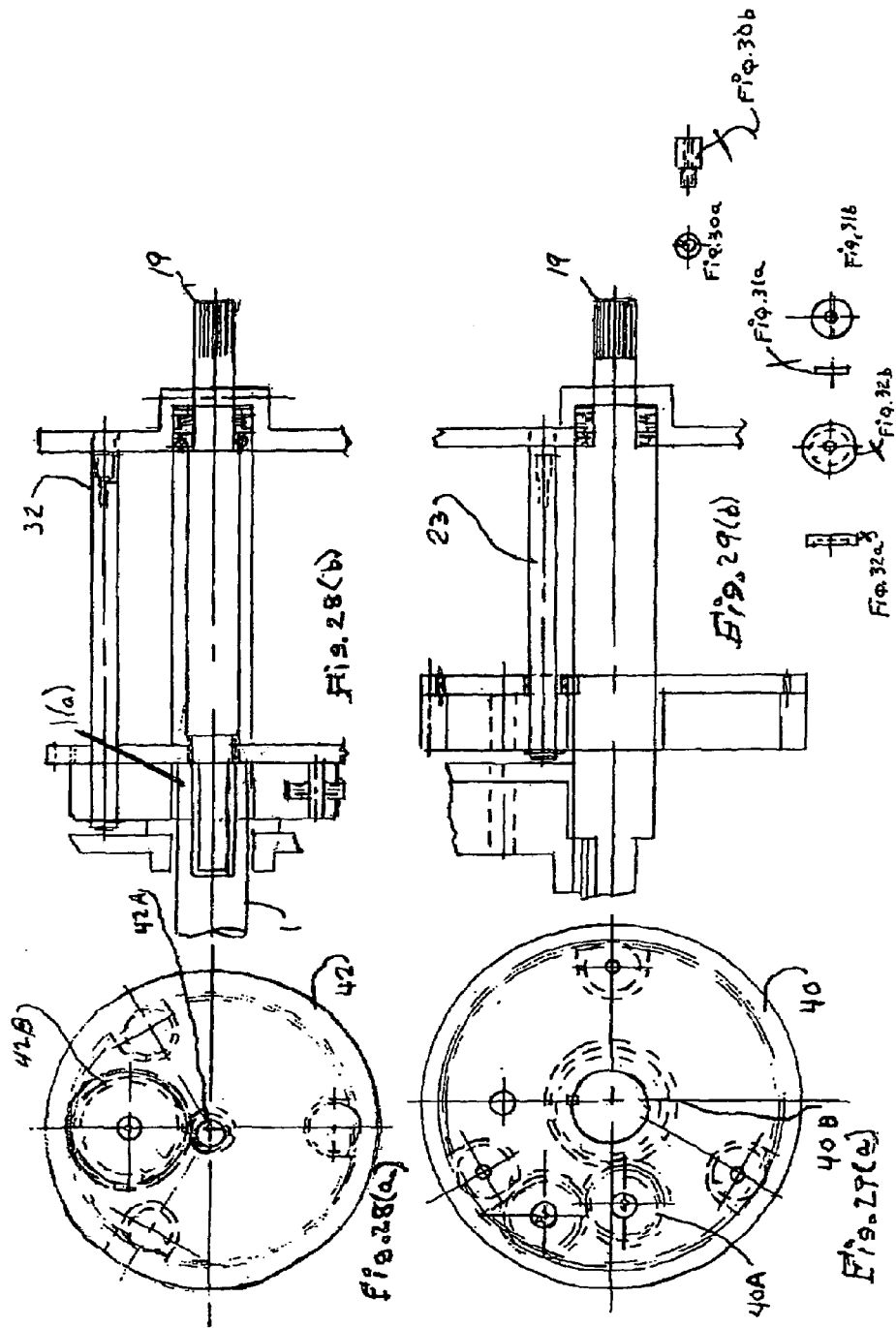

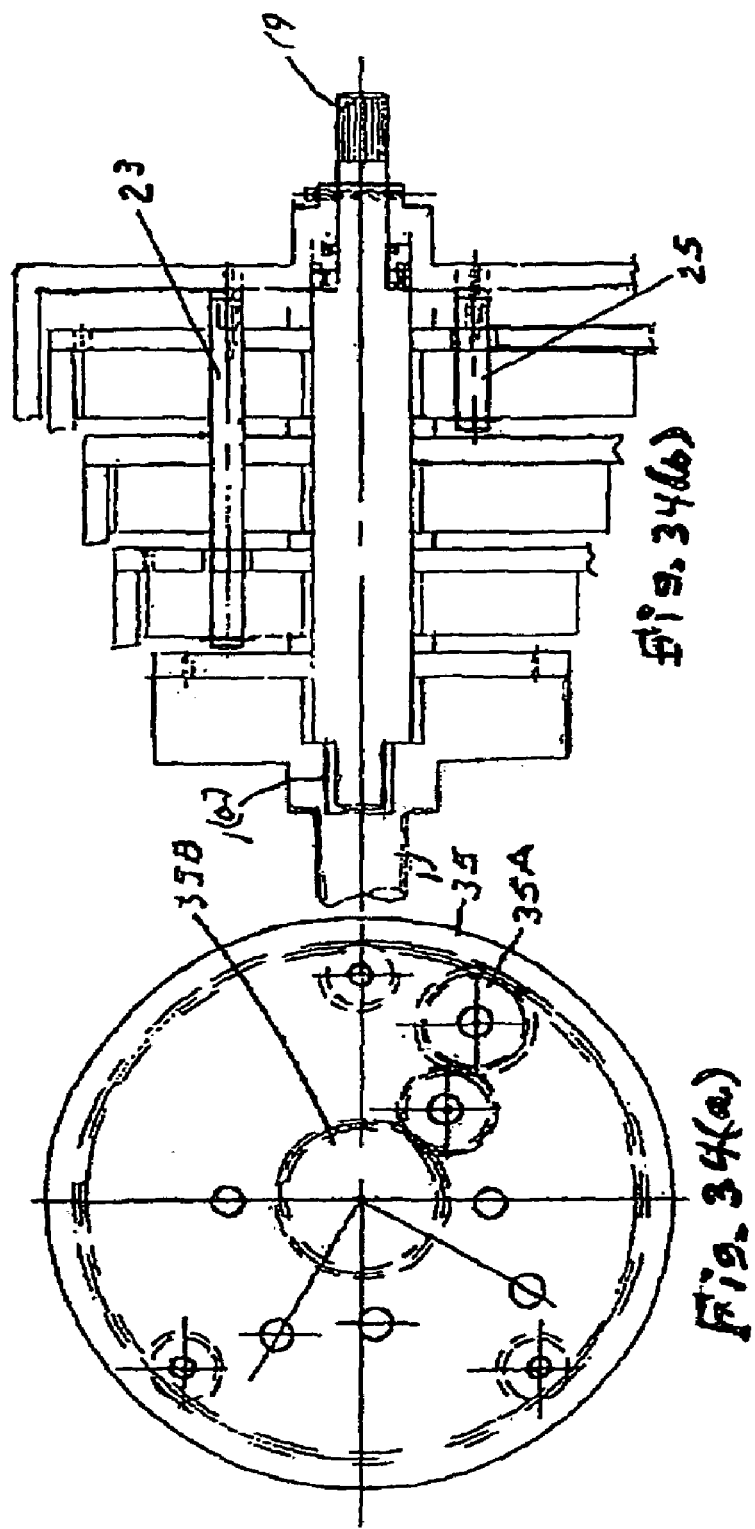

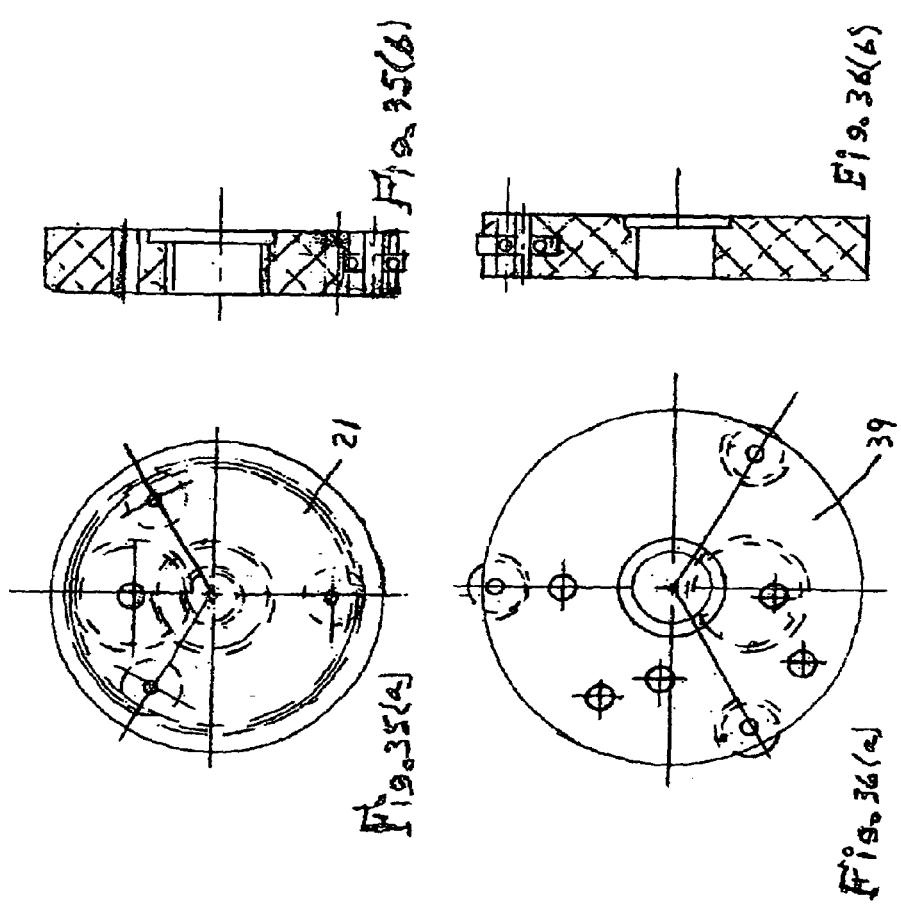

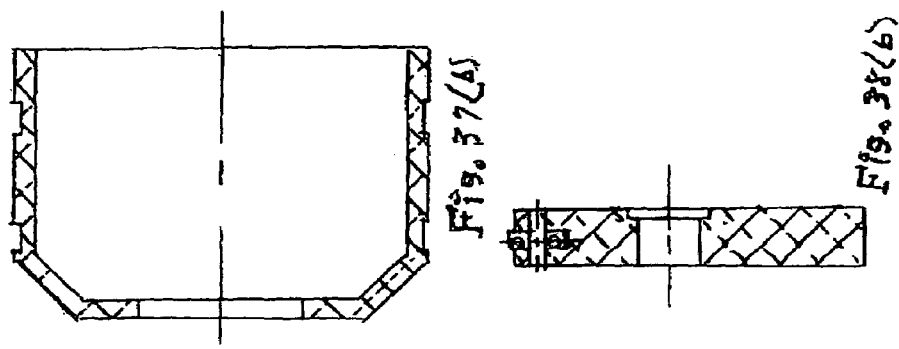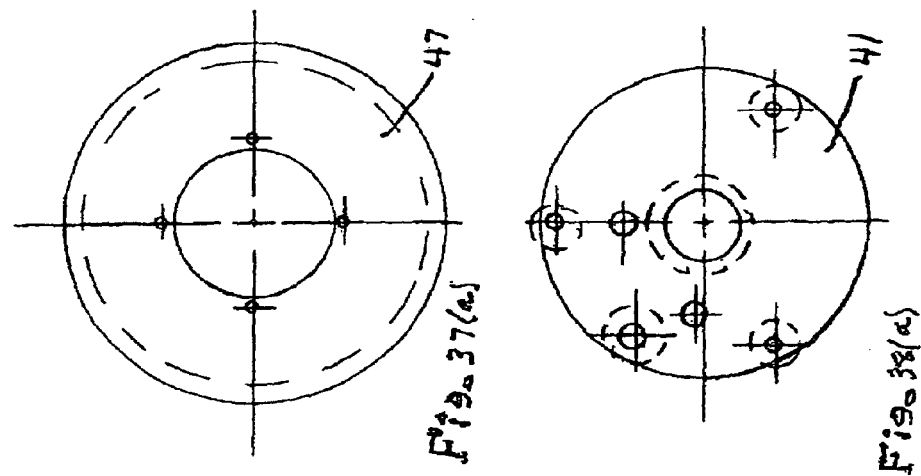

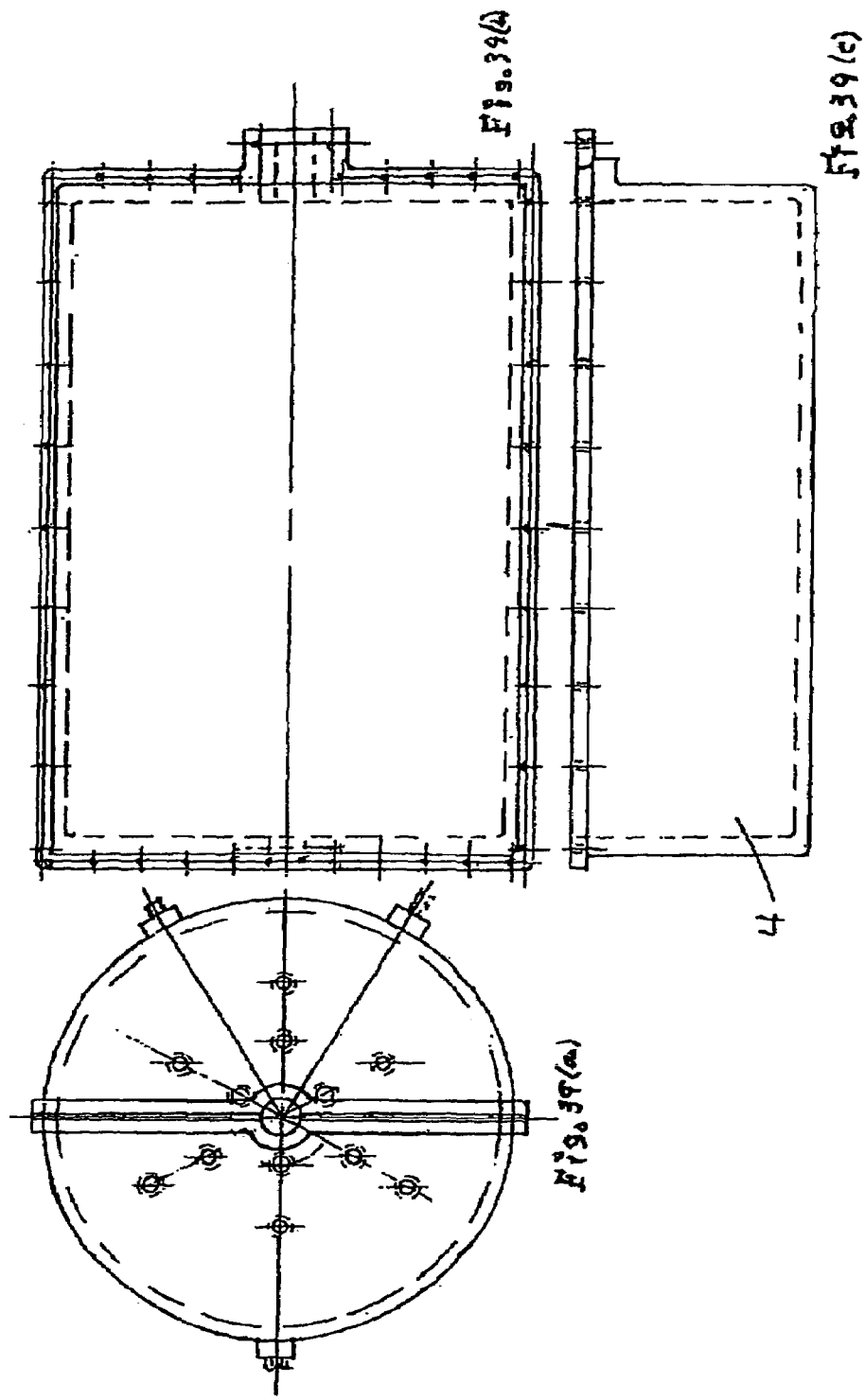

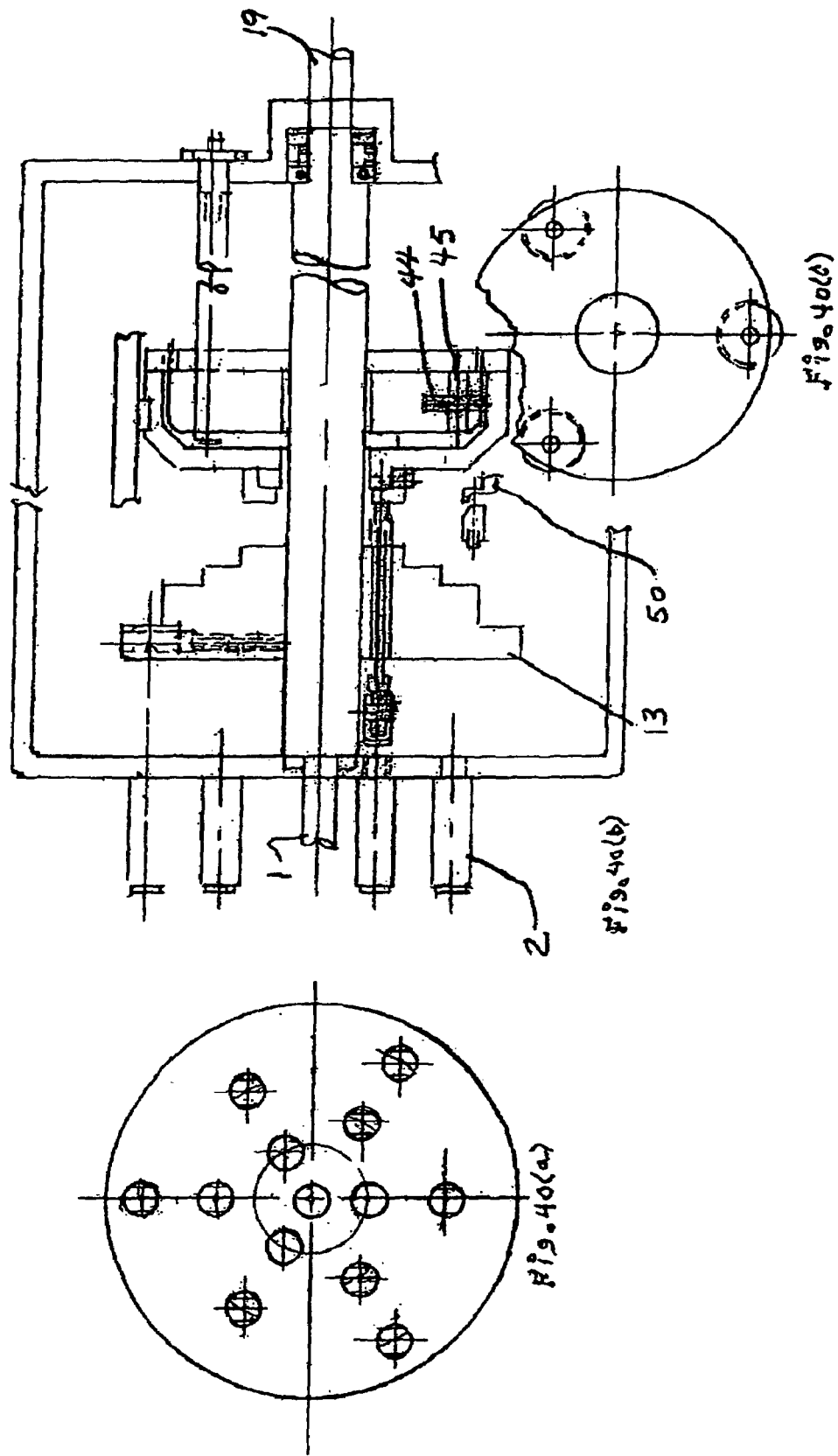

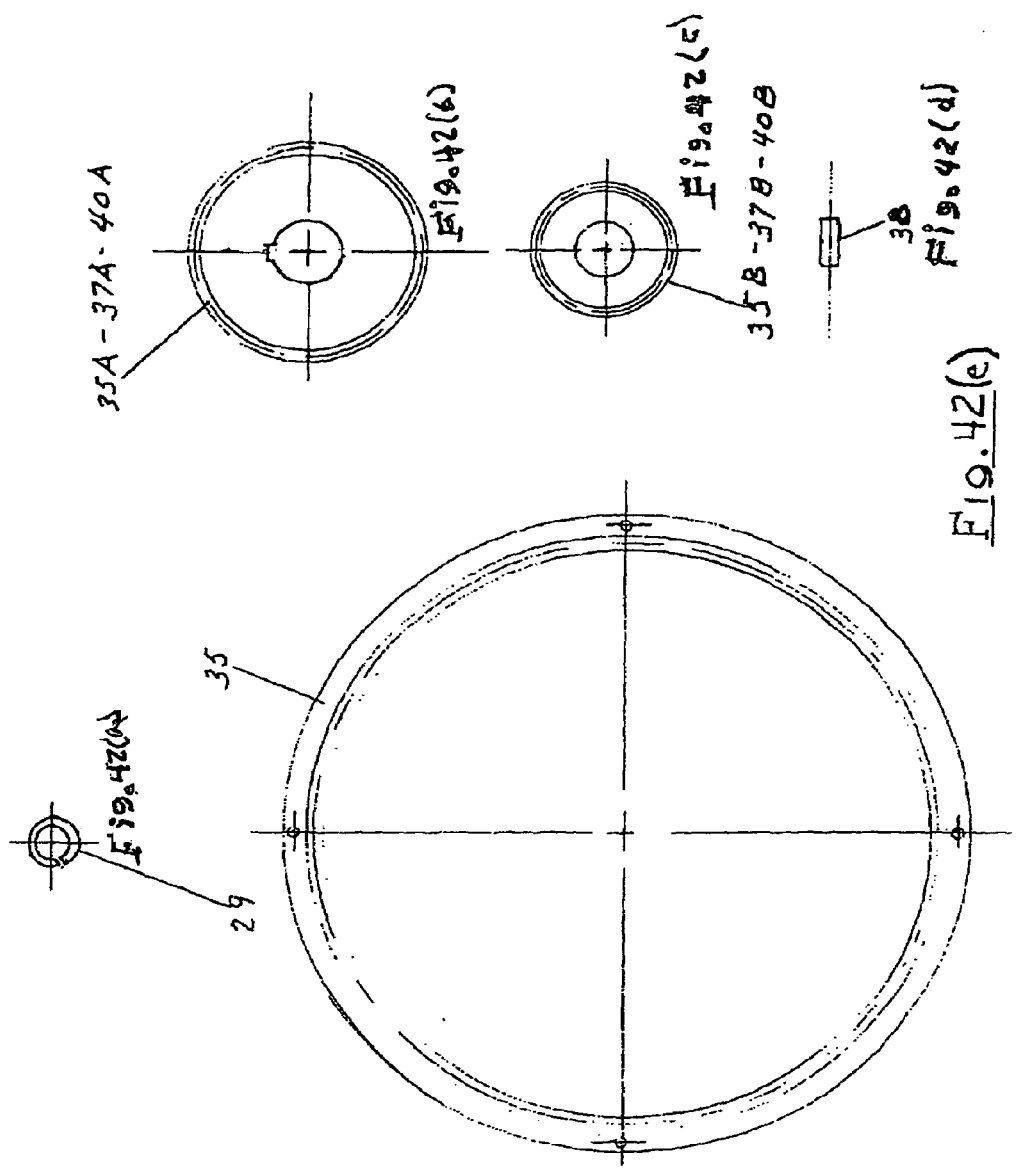

MULTI-SPEED, FORWARD-REVERSE TRANSMISSION

BACKGROUND OF THE INVENTION

1. Field of the Invention

The present invention generally relates to a transmission assembly for transmitting rotational movement from a transmission input shaft to a transmission output shaft. More particularly, the present invention relates to a transmission assembly for governing rotational movement intermediate a transmission input shaft and a transmission output shaft.

2. Description of the Prior Art

A transmission's primary function is to allow the engine to operate within its relatively narrow range of initial output speeds to provide a relatively wider range of secondary output speeds. In other words, without a transmission, vehicles would be limited to a single gear ratio. Transmissions thus typically incorporate the use of gears as a means to make more effective use of the engine's output torque, and to thereby maintain an appropriate speed.

Two general types of transmissions are well known in the art, namely, a manual transmission and an automatic transmission. The key difference between a manual and an automatic transmission is that the manual transmission engages and disengages different sets of gears to the output shaft to achieve various gear ratios, while in an automatic transmission the same set of gears produces all of the different gear ratios.

It will be noted from a general consideration of the state of the art that the prior art does not teach a transmission assembly that essentially comprises a transmission input shaft, an output shaft assembly, a plurality of cylinder arm assemblies; and a rod-translation system, thereby eliminating certain traditional transmission assembly structures such as flexbands, one-way clutches, torque converters, slide valves, governors, friction plates, separator plates, drums, and valve bodies. Thus the prior art perceives a need for a transmission assembly essentially comprising a transmission input shaft, an output shaft assembly, a plurality of cylinder arm assemblies; and a rod-translation system, and which eliminates the noted structures.

SUMMARY OF THE INVENTION

It is an object of the present invention to provide a transmission assembly that requires no flexband, no one-way clutches, no torque converter, so slide valve, no governor, no friction plates, no separator plates, no drum, and no valve bodies. It is thus a primary objective of the present invention to provide a transmission assembly requiring fewer components translatable into less costly repair and maintenance. The transmission assembly of the present invention thus essentially comprises a transmission input shaft, an output shaft assembly, a plurality of cylinder arm assemblies; and a rod-translation system. The input shaft comprises an engine-engaging first input shaft end, a shaft-engaging second input shaft end, a rotation transmissive portion, and an input axis of rotation. The rotation transmissive portion extends intermediate the first and second input shaft ends for transferring engine-originated rotational motion to the transmission assembly by way of the first input shaft end.

The cylinder arm assemblies are concentric about the input axis of rotation and comprise a reverse arm assembly and at least three forward arm assemblies. The cylinder arm assemblies each comprise an input arm end, an output arm end, and an inner arm diameter. The input arm ends are each independently geared to the rotation transmissive portion via the inner arm diameters. The rotation transmissive portion thereby enables reverse rotational movement of the reverse arm assembly and forward rotational movement of the forward arm assemblies.

The output shaft assembly comprises an output shaft and a stepped ring member. The output shaft comprises a shaft-engaging first output shaft end, a shaft-engaging second output shaft end, a rotation receptive portion, and an output axis of rotation. The rotation receptive portion extends intermediate the first and second output shaft ends. The stepped ring comprises a uniform inner diameter, at least four outer diameters, and a plurality of rod-receiving tunnels. The stepped ring receives the rotation receptive portion at the inner diameter and is fixedly attached thereto. The rod-receiving tunnels are parallel to the output axis of rotation. The first output shaft end is rotatively mated with the second input shaft end. The output and input axes of rotation are coaxial and the input and output shafts are independently rotatable. The rod-receiving tunnels are rotatable about the output axis of rotation.

The rod-translation system comprises a plurality of rods, bearing means for movement, and fixed rod-translating means. The rods are received in the rod-receiving tunnels and each comprises an arm-engaging first rod end and a bearing-engaging second rod end. Select second rod ends are cooperatively associated with the bearing means, and select bearing means are cooperatively associated with each cylinder arm assembly. The rod-translating means function to selectively translate the bearing means and rods intermediate an arm-engaged position and an arm-disengaged position. Select first rod ends engage a select output arm end when in the arm-engaged position for imparting rotational movement from the select output arm end to the output shaft via the stepped ring. The bearing means enable rotational movement of the output shaft relative to the rod-translating means.

The assembly-governing means may comprise a power source, circuitry, central-processing means, and rotation-sensing means. The power source energizes the central-processing means, the rotation-sensing means, and the rod-translation system by way of the circuitry. The rotation-sensing means are cooperatively associated with the output shaft for sensing the rotational speed thereof. The central-processing means are programmed to direct the rod-translating means according to pre-determined rotational speeds as comparable to actual rotational speeds sensed by the rotation-sensing means.

Other objects of the present invention, as well as particular features, elements, and advantages thereof, will be elucidated or become apparent from, the following description and the accompanying drawing figures.

DESCRIPTION OF DRAWINGS

FIG. 6 is the unique centrifugal module to take up some of the rotation torque that will be applied to the driven shaft and to contend with the increase and decrease in ratios and FIGS. 7 and 8 and 9 and 10 and 11 and 12 all serve 6 to achieve their function;

FIG. 13 shows the output shaft that will deliver power to the wheels per invention;

FIG. 14 is the input shaft that contains all the speed components and will be connected to the automotive drive shaft;

FIG. 15 is the adaptor connected axially and will accept the friction material component for energizing and deenergizing;

FIG. 16 are pusher rods for energizing and deenergizing their associated members in the invention;

FIG. 17 are bushings for 16 and 5;

FIG. 18 is the connector for 16 and 7 and 5;

FIG. 19 is an axial seal to bear on FIG. 14 per invention;

FIGS. 20 and 21 and 22 are washers to keep 35 and 33 in their respective locations axially per invention;

FIGS. 23 and 24 and 25 are split washers to keep 29 and 33 and 34 in their locations per inventions;

FIG. 26 is the friction material adaptor 50 for energizing and deenergizing the components per invention;

FIG. 28(*a*) is an end view schematic of the planetary gear set up for the reverse speed of the invention;

FIG. 28(*b*) is a side view schematic of the planetary gear set up for the reverse speed of the invention;

FIG. 29(*a*) is an end view schematic of the planetary gear set up for the $3^{rd}$ speed of the invention.

FIG. 29(*b*) is side view schematic of the planetary gear set up for the $3^{rd}$ speed of the invention.

FIG. 30 is an adaptor that completes the rod assembly;

FIG. 31 is a seal to contain the leakage of any fluids;

FIG. 32 is the holder for 31;

FIG. 33(*b*) is a side view schematic of the planetary gear set up for the $2^{nd}$ speed of the invention;

FIG. 34(*a*) is an end view schematic of the planetary gear set up for the $1^{st}$ speed of the invention;

FIG. 34(*b*) is a side view schematic of the planetary gear set up for the $1^{st}$ speed of the invention;

FIG. 35(*a*) is an end view of the support block for the reverse speed per invention;

FIG. 35(*b*) is a cross section view of the support block for the reverse speed per invention;

FIG. 36(*a*) is an end view of the support block for the $2^{nd}$ speed per invention;

FIG. 36(*b*) is a cross section view of the support block for the $2^{nd}$ speed per invention;

FIG. 37(*a*) is an end view of the $3^{rd}$ speed cylindrical arm per invention;

FIG. 37(*b*) is a cross section view of the $3^{rd}$ speed cylindrical arm per invention;

FIG. 38(*a*) is an end view of the support block for the $3^{rd}$ speed per invention;

FIG. 38(*b*) is a cross section view of the support block for the $3^{rd}$ speed per invention;

FIG. 39(*a*) is an end view of the case for the transmission per invention;

FIG. 39(*b*) is a plan view of a lower portion of the transmission case per invention;

FIG. 39(*c*) is a side view of the transmission case lower portion per invention;

FIG. 40(*a*) is an end view of the transmission case with hydraulic cylinders for selective activation of speeds per invention;

FIG. 40(*b*) is a side view schematic of hydraulic cylinder activation structure;

FIG. 40(*c*) is an end view schematic of a support block per invention;

FIG. 42(*a*) is a view of a lock washer per the invention;

FIG. 42(*b*) is a view of a sun gear per the invention;

FIG. 42(*c*) is a view of an idler gear per the invention;

FIG. 42(*d*) is a view of a roller per the invention; and

FIG. 42(*e*) is a view of a ring gear per the invention.

DETAILED DESCRIPTION OF THE PREFERRED EMBODIMENT(S)

Figure 1:
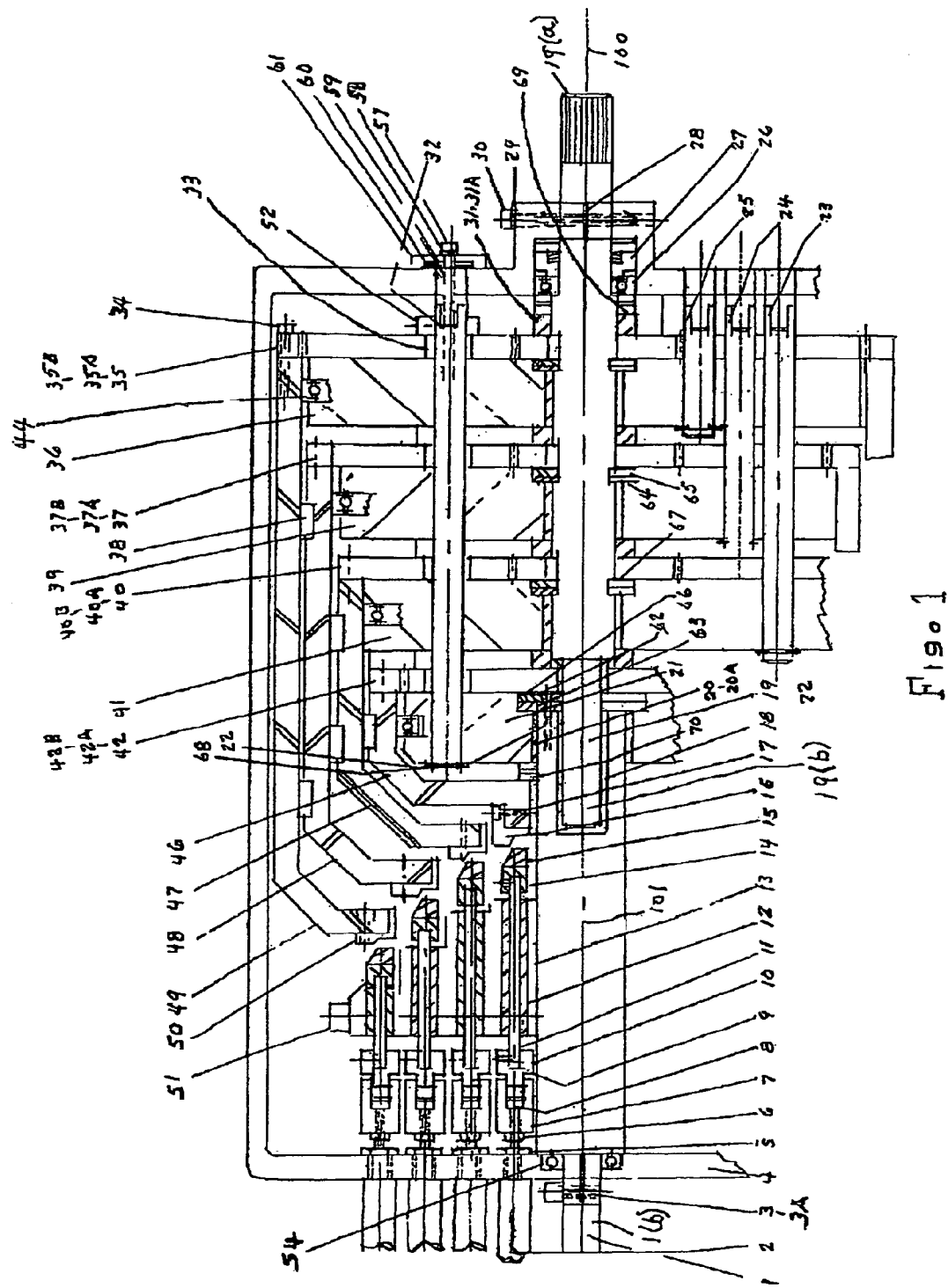
FIG. 1 is a schematic of the transmission according to the invention.
Figure 2:
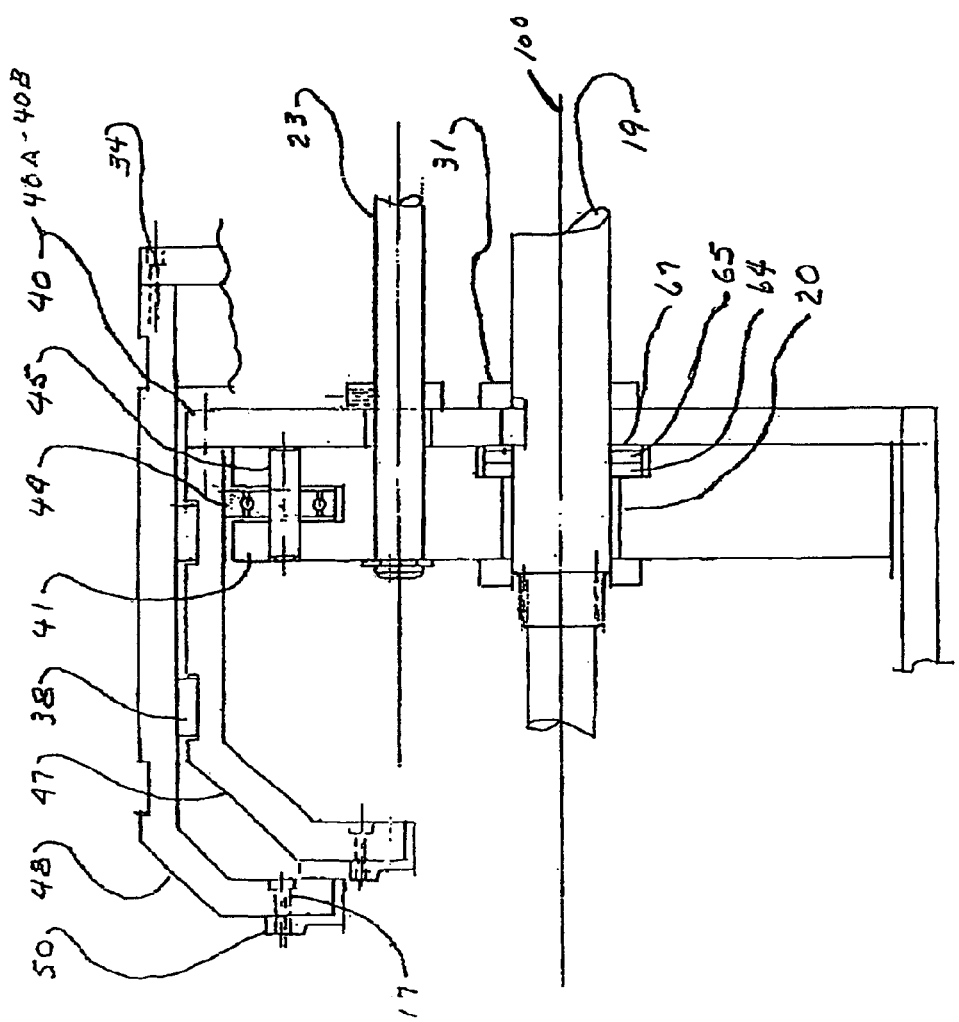
FIG. 2 is a partial schematic view of the different components and an axial view of the invention.
Figure 3:
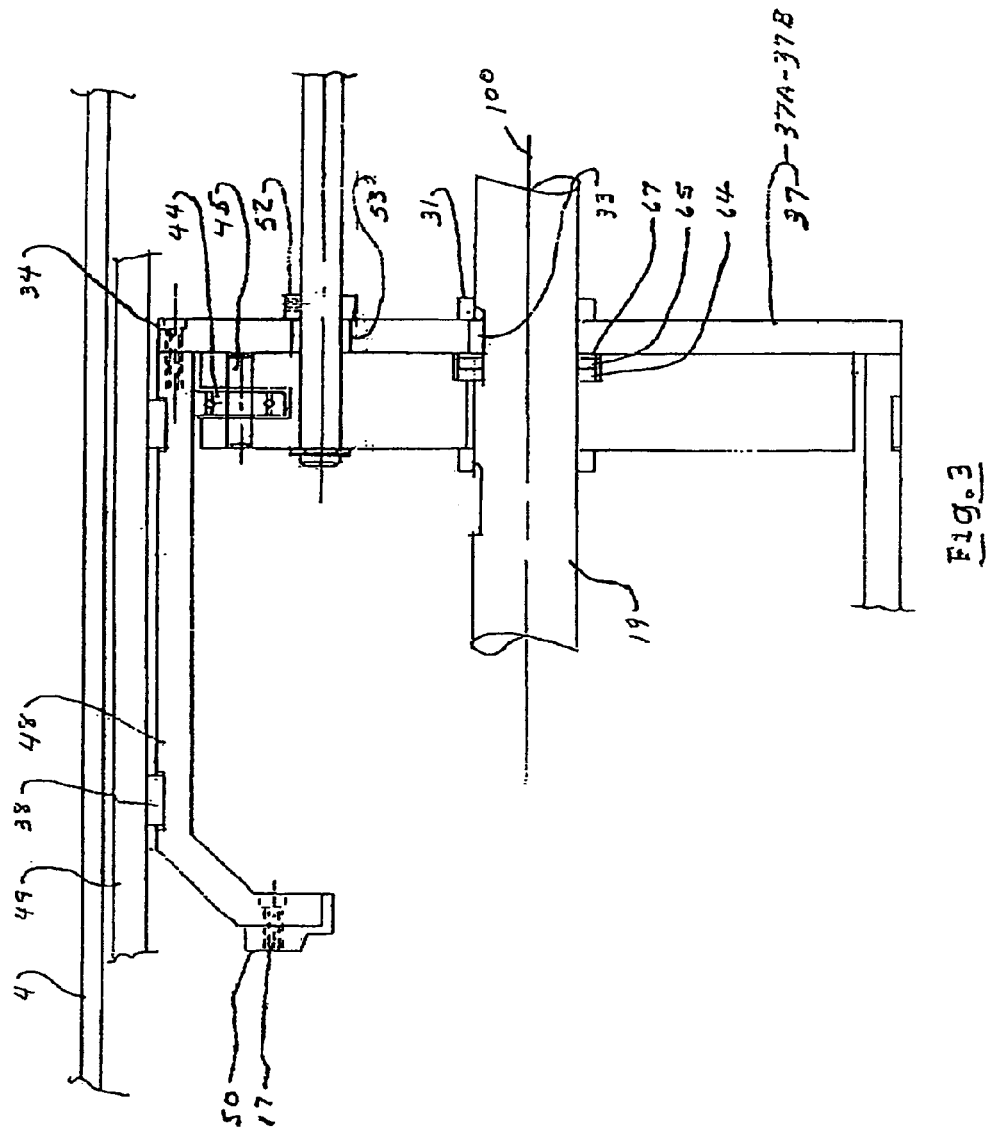
FIG. 3 is also a partial schematic view of the different components in the axial view of the invention.

Referring now to the drawings in more specificity, the preferred embodiment of the present invention concerns a transmission assembly or system for governing rotational movement intermediate a transmission input shaft 19 as illustrated and referenced in FIGS. 1-4, 14, 28, 29, 33, 34, and 40; and a transmission output shaft 1 as illustrated and referenced in FIGS. 1, 4, 5, 13, 27, 28, 33, 34, and 40. The preferred transmission system thus comprises input shaft 19; an output shaft assembly comprising output shaft 1; a plurality of cylinder arm assemblies; a rod-translation system; and certain assembly-governing means. It will be seen from an inspection of the noted figures that input shaft 19 preferably comprises an engine-engaging first input shaft end as depicted at 19(*a*) in FIGS. 1, 14, 28, 29, 33, and 34; a shaft-engaging second input shaft end as depicted at 19(*b*) in FIGS. 1, 14, 27, 28, 33, and 34; a rotation transmissive portion as generally depicted in FIGS. 2-4, and 14 (as at 19(*c*)); and an input axis of rotation as referenced at 100 in FIGS. 1-4, and 14. It will be seen from an inspection of the noted figures that the rotation transmissive portion 19(*c*) extends intermediate the first and second input shaft ends 19(*a*) and 19(*b*) for transferring engine-originated rotational motion to the transmission assembly by way of the first input shaft end 19(*a*).

Figure 4:
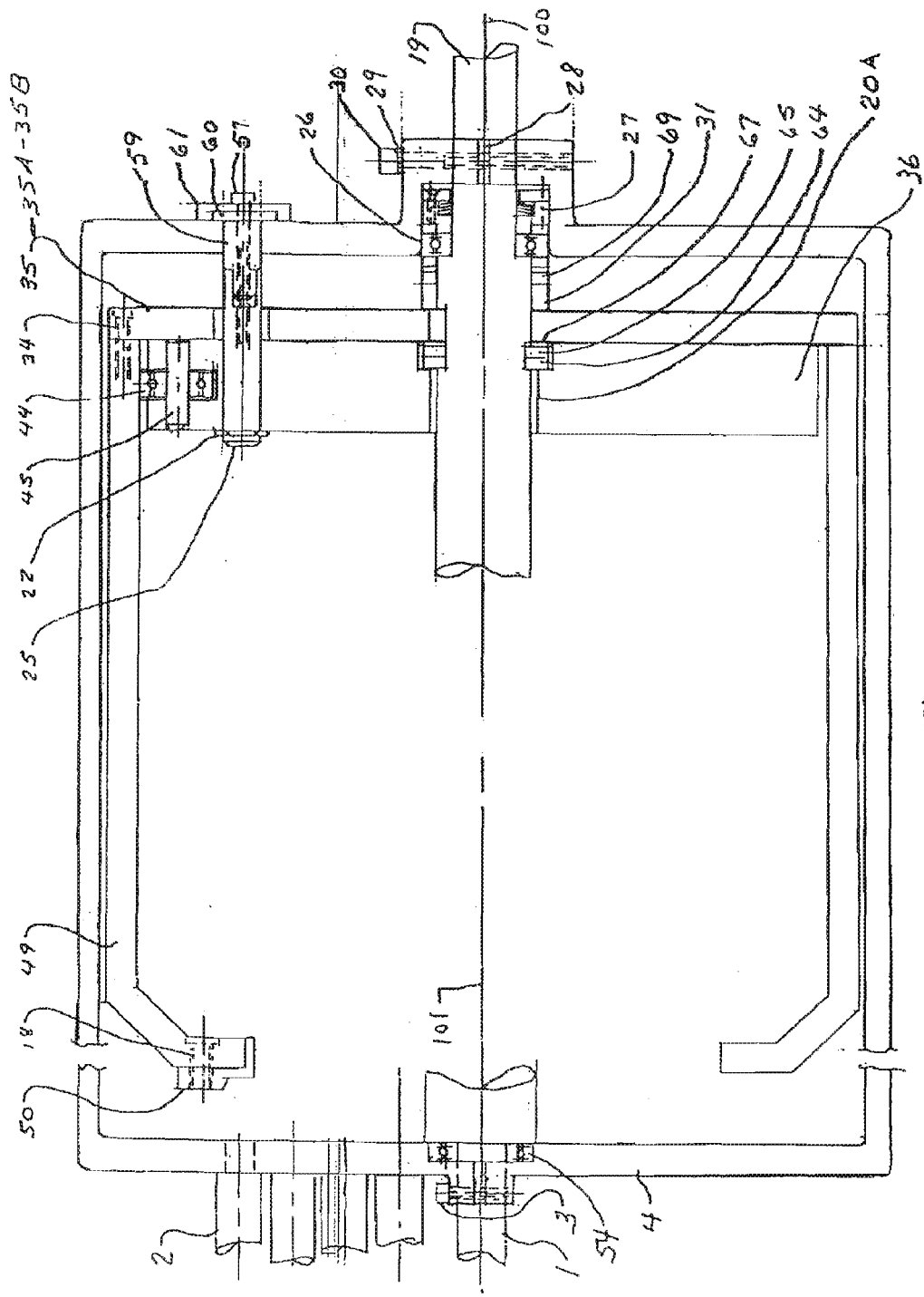
FIG. 4 is also a partial schematic view of the components in an axial view of the invention.
Figure 5:
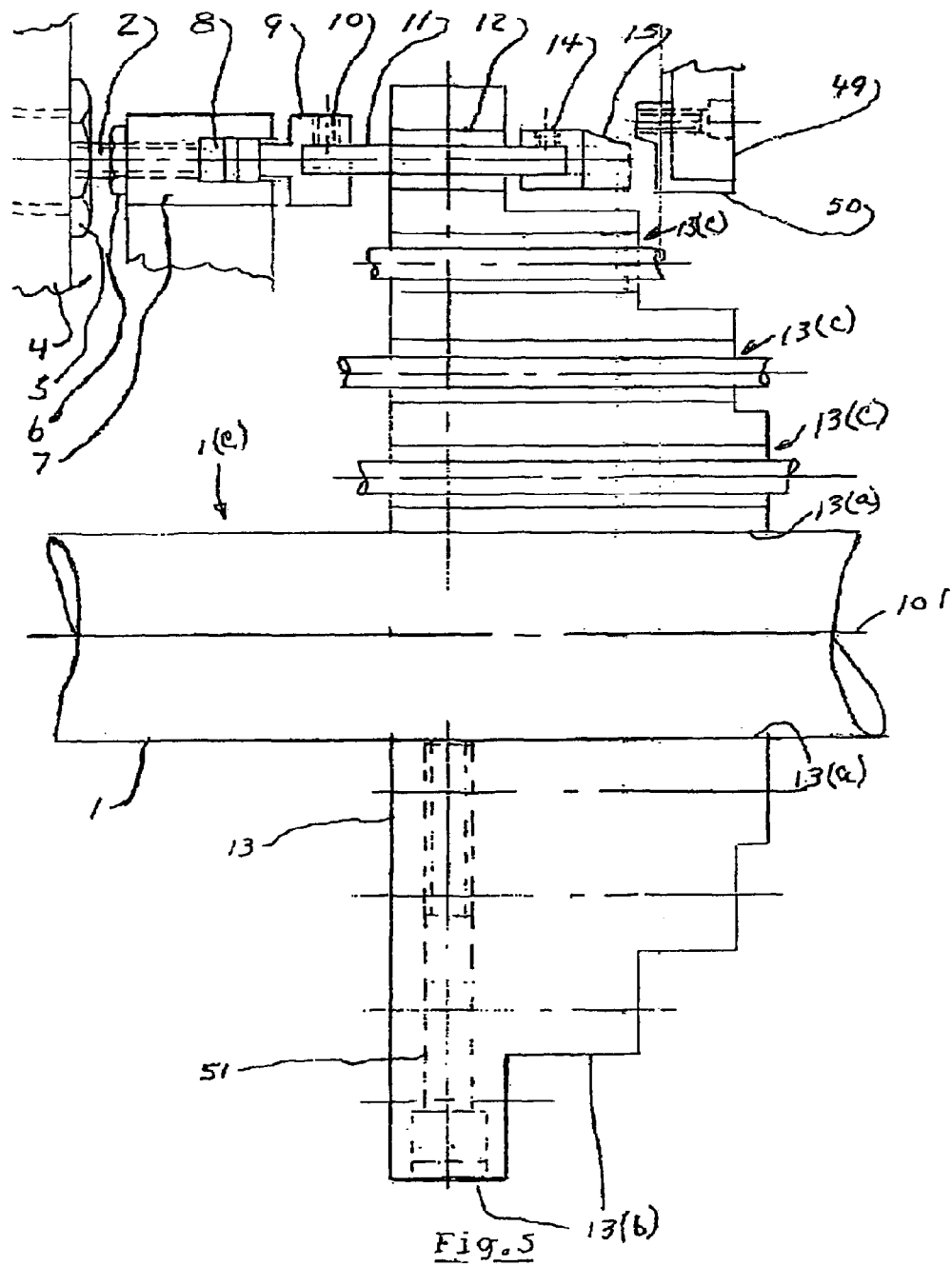
FIG. 5 is a view showing the function of the locking and unlocking mechanism for the different ratios of the invention.
Figure 9A:
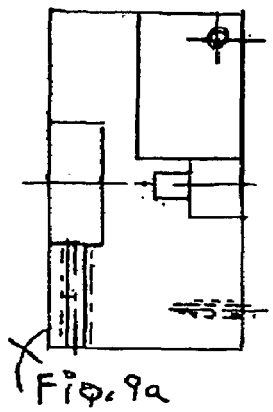
Figure 9B:
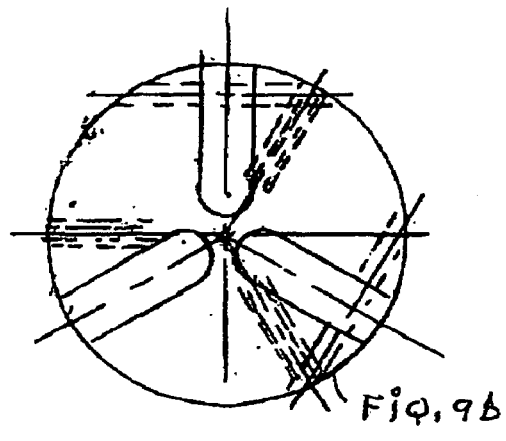
Figure 10A:
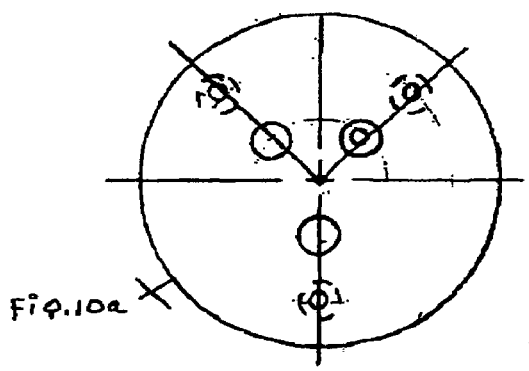
Figure 10B:
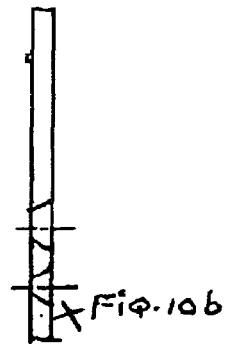
Figure 11A:
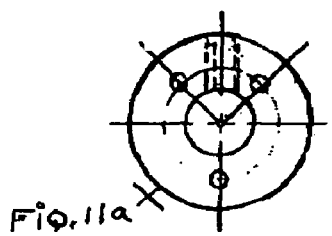
Figure 11B:
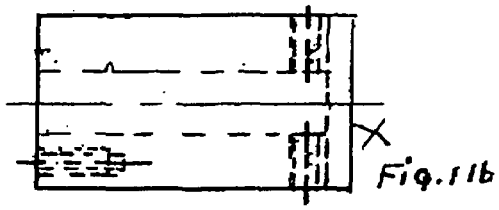
Figure 12A:
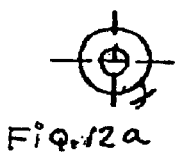
Figure 12B:
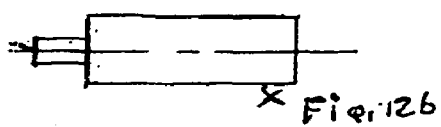

The output shaft assembly comprises output shaft 1 and a stepped ring or annular member 13 as illustrated and referenced in FIGS. 1, 5, and 40. The output shaft comprises a shaft-engaging first output shaft end 1(*a*) as depicted in FIGS. 13, 27, 28, 33, and 34; a shaft-engaging second output shaft end 1(*b*) as depicted in FIGS. 1 and 13; a rotation receptive portion as generally depicted in FIG. 5 at 1(*c*); and an output axis of rotation 101 as referenced in FIGS. 1, 4, 5, and 13. It will be seen from an inspection of the noted figures that the rotation receptive portion 1 (*c*) extends intermediate the first and second output shaft ends 1(*a*) and 1(*b*). It will be further seen from an inspection of FIG. 5 that the stepped ring or annular member 13 comprising a uniform inner diameter as at 13(*a*), at least four outer diameters as at 13(*b*), and a plurality of rod-receiving tunnels 13(*c*). The stepped ring 13 thus receives the rotation receptive portion 1(*c*) at the inner diameter 13(*a*) and is preferably fixedly attached thereto, for example, via detail 51. It should be noted that the rod-receiving tunnels 13(*c*) are parallel to the output axis of rotation 101. Further, the first output shaft end 1(*a*) is rotatively mated with the second input shaft end 19(*b*), the output and input axes of rotation being coaxial with one another. Noting that the input and output shafts 19 and 1 are independently rotatable, the rod-receiving tunnels (and the output shaft 1) are rotatable about the output axis of rotation 101 at rotational speeds not necessarily coinciding with the rotational speed of input shaft 19.

Figure 27:
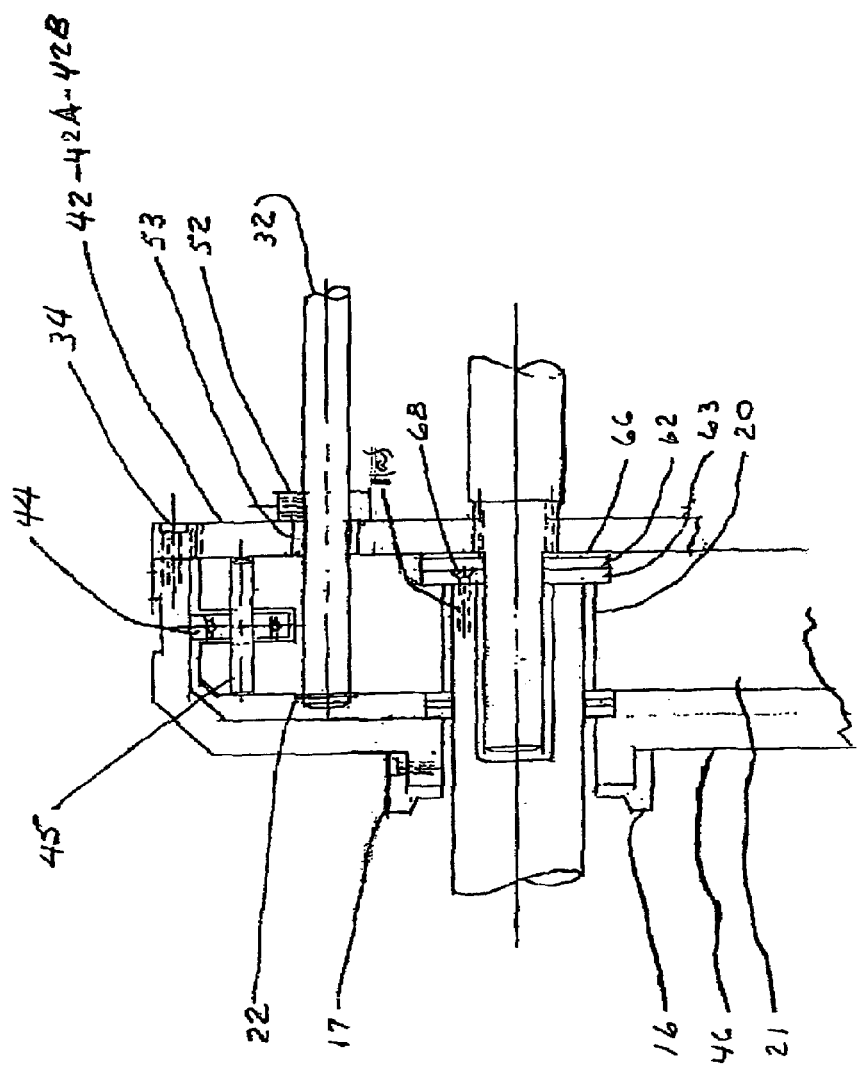
FIG. 27 is a partial schematic view of the components and an axial position of the invention.
Figure 33B:
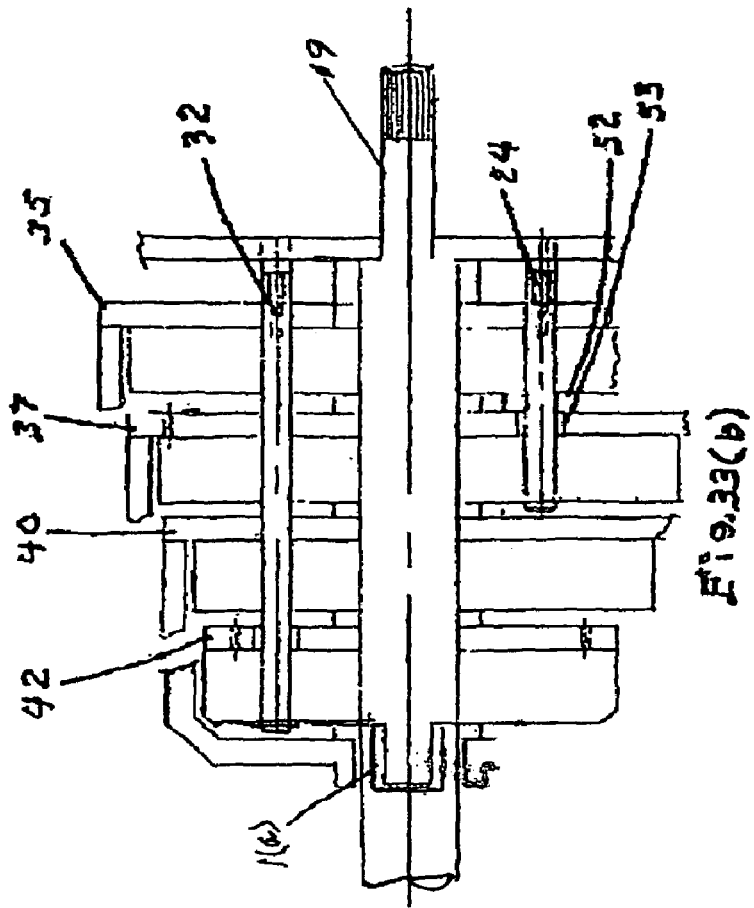
FIG. 33(*a*) is an end view schematic of the planetary gear set up for the $2^{nd}$ speed of the invention.
Figure 33A:
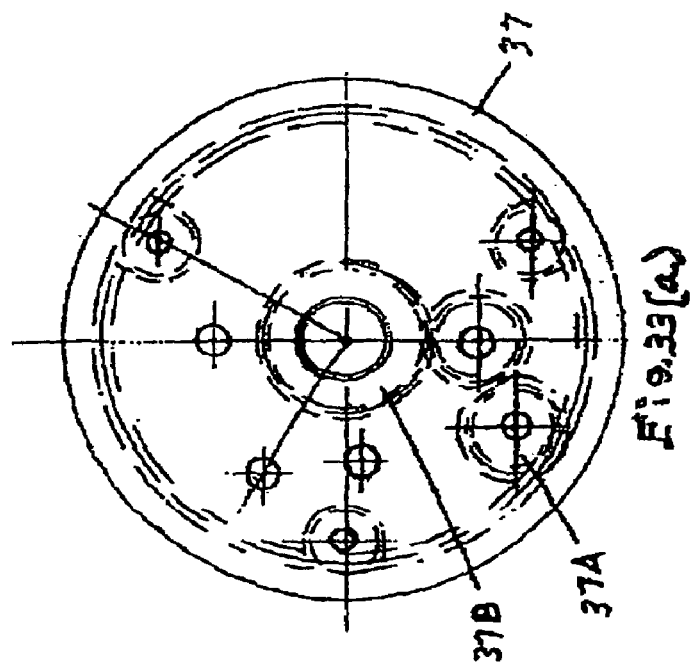

This feature is achieved through the incorporation of at least one and preferably a plurality of cylinder arm assemblies concentrically received about the input axis of rotation 100. In this regard, it should be noted that the cylinder arm assemblies preferably comprise a reverse arm assembly as generally depicted in FIGS. 27 and 28; and at least three forward arm assemblies as generally depicted in FIGS. 29, 33, 34, and 37. It will be seen from an inspection of the noted figures that the cylinder arm assemblies each comprise an input arm end radially adjacent the rotation transmissive portion 19(c), an output arm end radially adjacent the output shaft 1, and an inner arm diameter (at the input arm end), which inner arm diameters effect or enable varying gear ratios. The input arm ends are each independently geared to the rotation transmissive portion 19(c) via the inner arm diameters. The rotation transmissive portion 19(c) thereby enabling reverse rotational movement of the reverse arm assembly and forward rotational movement of the forward arm assemblies;

The rod-translation system 106 as generically depicted in FIG. 42 comprises a plurality of rods, certain bearing means for movement, and certain fixed rod-translating means, as may be preferably defined by a system of hydraulic cylinders 2 as generally depicted in FIG. 40 at 2 and as further referenced in FIGS. 1, 4, and 5. The rods are received in the rod-receiving tunnels 13(c) and comprise an arm-engaging first rod end and a bearing-engaging second rod end. Select second rod ends are cooperatively associated with the bearing means (as may be preferably defined by a plurality of thrust bearings). Certain select bearing means or thrust bearings are cooperatively associated with each cylinder arm assembly. The rod-translating means function to selectively translate the bearing means and rods intermediate an arm-engaged position and an arm-disengaged position. Certain select first rod ends thus engage a select output arm end when in the arm-engaged position for imparting rotational movement from the select output arm end to the output shaft via the stepped ring 13. The bearing means thus enable rotational movement of the output shaft 1 relative to the rod-translating means.

The assembly-governing means comprise a power source 102 as generically depicted in FIG. 42 (such as a 12 volt battery of the automobile), certain circuitry 103 as generically depicted in FIG. 42, certain central-processing means 104, and certain (shaft) rotation-sensing means 105. The power source 102 essentially functions to energize the central-processing means 104, the rotation-sensing means 105, and the rod-translation system 106 by way of the circuitry 103. The rotation-sensing means are cooperatively associated with the output shaft 1 for sensing the rotational speed thereof. The central-processing means are programmed to direct the rod-translating means 106 according to pre-determined rotational speeds as comparable to actual rotational speeds sensed by the rotation-sensing means 105.

The forward arm assemblies comprise an outer arm assembly (i.e. the first speed assembly) and a plurality of inner arm assemblies (i.e. the second and third speed assemblies). The inner arm assemblies and the reverse arm assembly each preferably comprise an outer cylinder diameter. The outer cylinder diameters each preferably comprise certain spacer-bearing means, the spacer-bearing means for effecting evenly spaced roller movement intermediate the cylinder arm assemblies.

At least four support blocks are cooperatively (and respectively) associated with the cylinder arm assemblies and comprise an outer block diameter. The outer block diameters each preferably comprise certain support-bearing means, the support bearing means for enabling evenly supported rotational cylinder movement about the support blocks. The support blocks thus function to effect coaxial rotational cylinder movement about the input axis of rotation 100.

The output arm ends each preferably comprise rod-engaging rings, the rod-engaging rings interfacing intermediate the output arm ends and the second rod ends for enhancing rotational movement transmission intermediate the cylinder arm assemblies and the rod-translation system 106. The second rod ends each comprise coned structure and the rod-engaging rings each preferably comprise cone-receiving structure. The coned structure is matable with the cone-receiving structure for enhancing rotational movement transmission intermediate the cylinder arm assemblies and the rod-translation system 106.

The transmission assembly is preferably received in a transmission housing sized and shaped to encase the cylinder arm assemblies, the rotation transmissive portion, the rotation receptive portion, the bearing means, the stepped ring, and the rods. The first input shaft end extends outwardly from the transmission housing for receiving engine-originated rotational motion. The second output shaft end extends outwardly from the transmission housing for imparting transmitted engine-originated rotational motion (for example, to a drive shaft assembly). The transmission housing is preferably liquid impermeable for receiving liquid lubrication means such as traditional transmission lubricant, which liquid lubrication means functions to lubricate the encased structure(s).

As described in more detail hereinafter, the rod-translating means are preferably hydraulically-based. A hydraulic cylinder 2 is preferably cooperatively associated with each rod for imparting motion thereto. The hydraulic cylinders 2 are preferably fixedly positioned at the transmission housing and communicate with the rods via the bearing means for imparting motion thereto.

In more specific terms, the reverse speed portion of the transmission assembly may be specified by the following. Detail 1 is the output shaft mated to detail 19 and supported by needle bearings detail 18 all speeds have three equally spaced hydraulic cylinders detail 2 nose mounted to the split case detail 4. The cylinder rod and nose mount cylinders will have jam nuts details 5 and 6 to keep them attached to their respective details. The rod detail 2 is attached to detail 7 a round piece and 3 equally spaced cylinders. Detail 7 has a thrust bearing detail 8 mounted in a groove of detail 7. When the hydraulic cylinders detail 2 are energized electronically and controlled by a logic circuit attached to a transmitter controlled by a special chip and powered by the 12 volt battery of the automobile, they move detail 9 which has a set screw to secure it to detail 11 which also has detail 14 and a set screw to attach it to detail 11 detail 14 also has detail 15 which is the friction material (ceramic, impregnated paper, brake lining material) which is bonded to detail 14. Detail 15 is coned at an angle.

Details 9, 11, 14 slide between (bronze or iolite bearings) forward and reverse in detail 13, which is attached to the output shaft detail 1 by two socket head screws 180 apart detail 51. It is noteworthy that all forward speeds are also attached to detail in a similar manner. Detail 16 is a ring bolted to detail 46 the cylindrical reverse arm. Detail 46 which is supported by 3 equally spaced ball bearings detail 44 and held in place by detail 45 a round special dowel and mounted to detail 21 (reverse support block) detail 70 is a thrust bearing that bears detail 20, 62, 63, and detail 42b. Detail 21 also has a bronze or oilite bearing detail 20 fitted into it's inside diameter. Detail 63 is a steel washer held in place by detail (flat head screws) attached to the output shaft detail 1, detail 62 is a bronze or iolite bearing and detail 66 is a nylatron washer which lays against idler gear detail 42b and detail 62. The driving gear detail 42b meshes with the splines on the input shaft detail 19 and idler gear 42b meshes with the internal ring gear detail 42, which is attached to detail 46 with 4 soc. head screws detail 34. Detail 32 is a rod, which pass through detail 21 support lock and has bronze or oilite bearings detail 53 mounted to its inside diameter. Rod 32 also has detail 52 (a collar) to keep the gear on the rod in place. The front of the rod detail 32 has a snap ring detail 22 attached to keep it from coming out of location. A very important factor is that all rods details 32, 23, 24, and 25 are just short of the inside of the case detail 4 so that they can all be assembled in their respective places per design. They will all have inserts detail 59 at assembly. On the outside of detail 46 (reverse arm) is a groove for ¼ diameter rollers detail 38. These rollers help support the third. speed cylinder arm detail 47.

The third speed of the transmission assembly may be specified by the following. The reverse cylinder arm detail 46 has a groove on its outside diameter to support detail 47 the third. speed or high speed or 6 speed) arm and it has two grooves on it's outside diameter to accept rollers detail 38 and the support detail 41. The third speed support block detail 41 has 3 equally spaced bearings detail 44 and detail 45 pin assembled into detail 41 (support detail), which has a bronze or oilite bearing detail 20a. Detail 47 (the third speed cylinder arm) has an internal ring gear detail 40 bolted to it and it drives details 40a and 40b. Detail 42b is keyed to the input shaft detail 19. Detail 42b is common to the third, second, and first, speeds. The third speed support (detail) has a bronze or oilite bushing on its inside diameter. Rod detail 23 goes through the support block detail 41 and has a snap ring detail 22 to keep it in its location and insert detail 59 at assembly. There is a collar detail 52 between support block detail 41 and idler gear detail 40b. The support block also has the split rings details 64, 65, and 67. A cast iron ring detail 53 bears between details 40b and 39.

The second speed of the transmission assembly may be specified by the following. The second speed cylinder arm detail 48 has 2 grooves on its outside diameter with rollers to support the first. speed cylindrical. The second speed cylinder arm has an internal ring gear detail 37 and idler gears detail 37a, 57b and drive gear detail 42b, which is keyed to the input shaft detail 19. Detail 39 is the support block which has 3 equally spaced ball bearings detail 44 and special dowel pin detail 45 which also support the second speed cylinder arm 48. The support block detail 39 has a bearing detail 20a on it's inside diameter. The rod detail 24 has a snap ring on its front to keep it in location and goes through the support block detail 39. The support block 39 also has split rings details, 65, and 67; there is a cast iron ring detail 31a and a collar detail 53 to keep the correct spacing. It is noteworthy that the second speed is energized and deenergized in the same manner as reverse and third speeds.

The first speed of the transmission assembly may be specified by the following. The first speed cylinder arm detail 49 also has a cylindrical ring detail 35 and screwed or bolted to it by detail 34. Cylinder arm detail 49 is supported by rollers detail 38 and by ball bearings detail 44 and pin detail 45 to support detail 49 the first speed cylindrical arm. The support block detail 36 also has a bronze or oilite bearing detail 20a bearing on it's inside diameter. The first speed internal ring gear 35 drives gears 35a, 35b and 40b, which is keyed to the input shaft detail 19. The rod detail 25 goes through the support block detail 36 and has a bearing detail 20a on it's inside diameter and there is a collar detail 52 and a snap ring detail 22 to keep the spacing correct. The support block detail 36 also has detail 64, 65, and 67 which are split to aid in assembly. At this point we have detail 31a cast iron ring, detail 69 thrust bearing, detail 26 ball bearing and seal detail 27. Also on the rod end detail 25 we have detail 59 the rod insert that goes through the case detail 4. Detail 28 is a gasket material to seal both halves of the case detail 4. Details 57, 58, 60, and 61 are to seal all the rod ends. This should stop any leakage of transmission fluid from coming out of the case detail 4. The third speed rod detail 23 Goes through detail 41, 39, 36 and case detail 4 with insert 59. The second speed rod detail 24 goes through detail 39, 36, and the case detail 4 with insert detail 59. The first speed rod detail 25 goes through detail 36 and the case detail 4 with insert detail 59. The two halves of the case detail 4 and 30, 3, 3a are screws and lock washers to close the case detail 4 at assemble. The case will have a fill hole and drain hole for the transmission fluid. One third of the bottom of the case will be filled with a transmission fluid. The case detail 4 will have urethane and bolts extending through for mounting and isolating any noises.

It is contemplated that all planetary gears will be helix or hypoid. They will run very quietly and very smooth. The left inside of the case detail 4 will have a ball bearing detail 54 and detail 3 and 3a. Note: The input shaft will be attached to the crankshaft be it by gears, chain, or exactly as they do today for all trans axle and rear drive automobiles.

As mentioned previously, each speed will have a set of three (3) hydraulic cylinders, which will operate together. Once the user shifts to a selected speed the rest will be automatic. In neutral nothing happens. When in park, a pawl will clamp the output shaft detail 2 and also stop any forward or reverse movement. One will not be able to move unless the pawl is released. The speedometer will be mounted on the output shaft detail 1. A centrifugal modulator will be mounted on the input shaft detail 19 in front of the case detail 4. This modulator will eliminate the torque converter. There will be two (2) lines coming from the centrifugal modulator. One input line and one output line. One line will extend from the hydraulic tank to the pump to the modulator and the other line will extend to the transmitter. The hydraulic tank can be mounted wherever convenient and so too the automatic control box.

Figure 41:
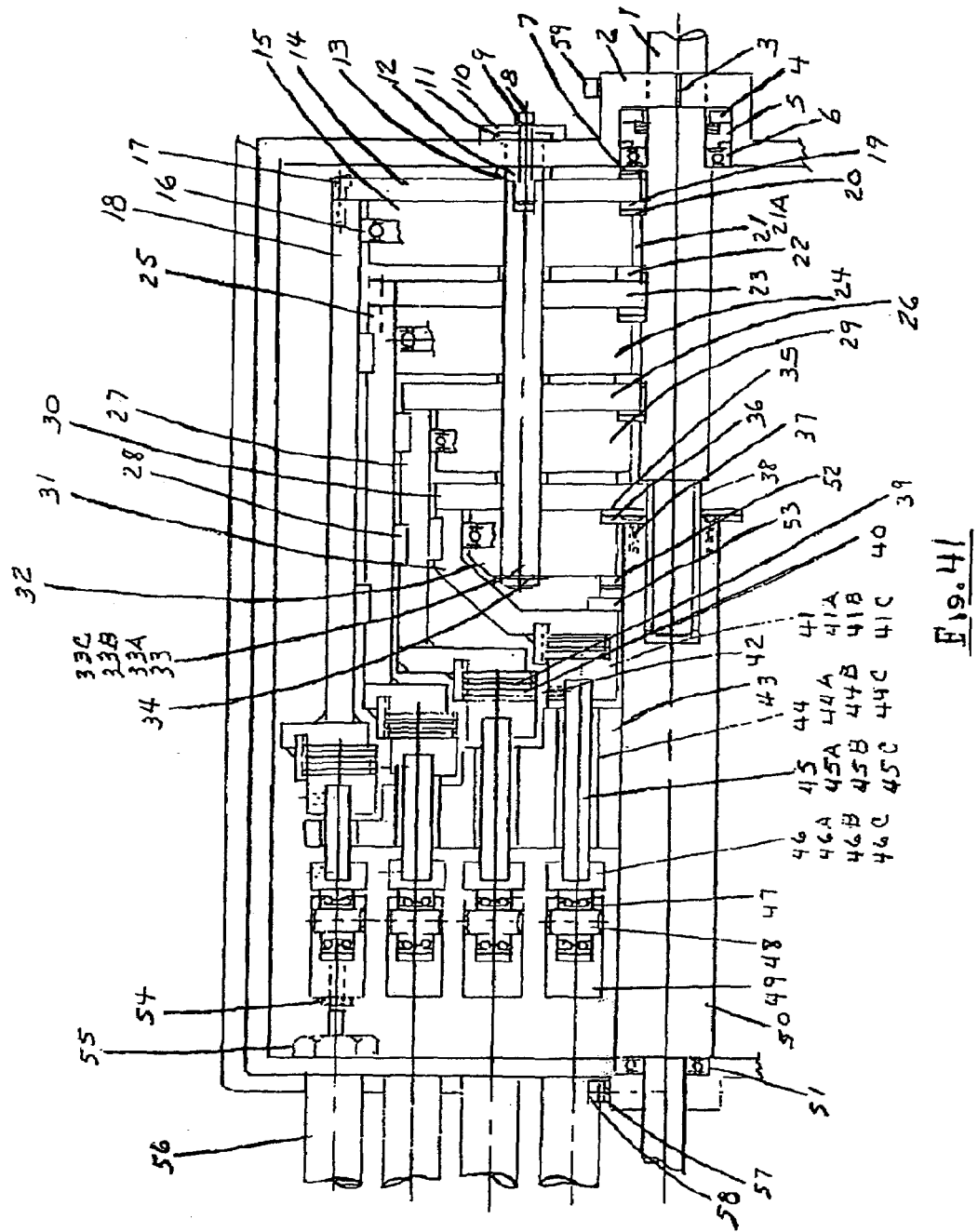
FIG. 41 is a schematic of another embodiment of the transmission according to this invention.

Optionally, FIG. 41 depicts Detail 1 is the input shaft looking to the right side of the design. Detail 1 will be hooked to the crankshaft of the automotive combustion engine. It extends through the case detail 2, which is split into 2 halves for purposes of assembly of all the components. It has a flange all around and a gasket material detail 3 between the two halves for sealing the transmission fluid from leaking out. On shaft detail 1 we also have details 4 and 5, which is a plate and another seal unit to keep any fluid from leaking past the shaft detail 1 and case detail 2. Mounted to the shaft detail 1 is a ball bearing detail 6, which keeps the shaft detail 1 and case detail 2 in line at assembly. Detail 7 a thrust bearing bears against the outer race of detail 6 an the internal ring gear detail 14 of the 1$^{st}$.speed ring gear. detail 14 is bolted to support block detail 15 which has a bronze or oilite bearing detail 21 mounted into it's inside diameter. The support block detail 15 also has 3 equally spaced ball bearings detail 16 which are pinned to it, to keep the ball bearing detail 16 in place. 4 socket head screws detail 17 bolt detail 14 the internal ring gear to the cylindrical arm detail 18. detail 19 is a ring that fits into the same keyway as the internal ring gear detail 14 does. Detail 20 is a bronze or oilite ring that also fits into the same keyway. Note: details 19 and 20 are split in half so that you can assemble them in place. Detail 22 is a cast iron ring or bearing to keep the spacing correct at assembly. Again Note; details 19,20,21, and 22 are exactly the same through the 1st. 2$^{nd}$. And 3$^{rd}$. speeds. The rod detail 33, 33a, 33b, and 33c are all kept in place by snap ring detail 34 and they all pass through their respective support blocks details 32, 29, 24, and 15. the rods. Details 33, 33a, 33b, and 33c are all foreshortened so that we can assembly the 2 halves of the case detail 2. A locking collar detail 13 with set screws keep the idler gears in place. All the idler gears in each planetary gear will have bronze or oilite bushings in their inside diameters. The right side of the assembly-rod end has a screw detail 8, a lock washer detail 9 a ring holder detail 10 a rubber or suitable material detail 11 and the insert detail 12 which is common to all rods at assembly. Note: all cylindrical arms will have a planetary gear setup and an internal ring gear attached to it for each speed. Each cylindrical arm will have a round insert with splines on the inside diameter to match the splines on the outside diameter of the plates detail 40. The friction material bonded to steel plates detail 32 which will also have splines on the inside diameter and match the splines on detail 41. The friction material is not to cover the splines. This represents the friction package for each speed. The packs look the same except there inside and outside diameters will be different. The splines will also be different. Between details 32 and 31 will be a thrust bearing detail 52 and a cast iron ring detail 53 to keep the proper spacing detail 41, 41*a*, 41*b*, and 41*c* will be a round block with set screw 42 to hold each friction pack. Detail 43 is an aluminum block to hold details bronze or oilite bearings 44, 44*a*, 44*b*, and 44*c* plus hold details 45, 45*a*, 45*b*, and 45*c*. Details 46, 46*a*, 46*b*, and 46*c* are round rings with a setscrew to lock onto details 45, 45*a*, 45*b*, and 45*c*. Detail 49 is a round block with a recess in it to hold a double row ball bearing detail 47 and pin detail 48 and has a threaded hole to accept the rod diameter of the hydraulic cylinder and jam nut detail 54 and these hydraulic cylinders are nose mounted into the left side of the case detail 2 and a jam nut to lock them in place. We now cover the output shaft detail 50, which has needle bearings detail 38 rotating about the input shaft detail 1. In front of the internal ring gear 30 we have detail 35 and detail 36—detail 36 is screwed to the output shaft detail 50, and detail 35 is a bronze or oilite bushing to keep this section in their respective place. Detail 51 is a ball bearing mounted into the left half of the case detail 2. Details 57 and 58 are a lock washer and socket head screw. Detail 28 (rollers) supports all the cylindrical arms. Note: on all hydraulic cylinders there will be a magnet on the outside diameter on it's front end and rear end, there will be reed valves strapped over these magnets and each set of three hydraulic valves will be wired to a single solenoid valve and than powered by the 12 volt battery to push or pull. There will be a valve on the oil tank also. The hysteresis between each speed will be in milliseconds meaning we can eliminate the governor and slide valve in the present automotive transmission. This compensates for the changes in speed and the shift points.

While the above description contains much specificity, this specificity should not be construed as limiting the scope of the invention, but rather as an exemplification of the invention. For example, as is described hereinabove, it is contemplated that at least three forward speeds may be incorporated into the design. Thus, four, five, and six speed versions are further contemplated as falling within the broad scope of the disclosed invention. Accordingly, although the invention has been described by reference to certain preferred embodiments, it is not intended that the novel disclosures herein presented be limited thereby, but that modifications thereof are intended to be included as falling within the broad scope and spirit of the foregoing disclosure, the following claims and the appended drawings.

We claim:

1. A transmission system, the transmission system for governing rotational movement intermediate a transmission input shaft and a transmission output shaft, the transmission system comprising:

an input shaft, the input shaft comprising an engine-engaging first input shaft end, a shaft-engaging second input shaft end, a rotation transmissive portion, and an input axis of rotation, the rotation transmissive portion extending intermediate the first and second input shaft ends for transferring engine-originated rotational motion to the transmission assembly by way of the first input shaft end;

a plurality of cylinder arm assemblies, the cylinder arm assemblies being concentric about the input axis of rotation and comprising a reverse arm assembly and at least three forward arm assemblies, the cylinder arm assemblies each comprising an input arm end, an output arm end, and an inner arm diameter, the inner arm diameters for effecting varying gear ratios, the input arm ends each being independently geared to the rotation transmissive portion via the inner arm diameters, the rotation transmissive portion thereby enabling reverse rotational movement of the reverse arm assembly and forward rotational movement of the forward arm assemblies;

an output shaft assembly, the output shaft assembly comprising an output shaft and a stepped ring, the output shaft comprising a shaft-engaging first output shaft end, a shaft-engaging second output shaft end, a rotation receptive portion, and an output axis of rotation, the rotation receptive portion extending intermediate the first and second output shaft ends, the stepped ring comprising a uniform inner diameter, at least four outer diameters, and a plurality of rod-receiving tunnels, the stepped ring receiving the rotation receptive portion at the inner diameter and being fixedly attached thereto, the rod-receiving tunnels being parallel to the output axis of rotation, the first output shaft end being rotatively mated with the second input shaft end, the output and input axes of rotation being coaxial, the input and output shafts being independently rotatable, the rod-receiving tunnels being rotatable about the output axis of rotation;

a rod-translation system, the rod-translation system comprising a plurality of rods, bearing means for movement, and fixed rod-translating means, the rods being received in the rod-receiving tunnels and each comprising an arm-engaging first rod end and a bearing-engaging second rod end, select second rod ends being cooperatively associated with the bearing means, select bearing means being cooperatively associated with each cylinder arm assembly, the rod-translating means for selectively translating the bearing means and rods intermediate an arm-engaged position and an arm-disengaged position, select first rod ends engaging a select output arm end when in the arm-engaged position for imparting rotational movement from the select output arm end to the output shaft via the stepped ring, the bearing means enabling rotational movement of the output shaft relative to the rod-translating means; and assembly-governing means, the assembly governing means comprising a power source, circuitry, central-processing means, and rotation-sensing means, the power source energizing the central-processing means, the rotation-sensing means, and the rod-translation system by way of the circuitry, the rotation-sensing means being cooperatively associated with the output shaft for sensing the rotational speed thereof, the central-processing means being programmed to direct the rod-translating means according to pre-determined rotational speeds as comparable to actual rotational speeds sensed by the rotation-sensing means, the transmission system thus for governing rotational movement intermediate the input shaft and the output shaft.

2. The transmission system of claim 1 wherein the forward arm assemblies comprise an outer arm assembly and a plurality of inner arm assemblies, the inner arm assemblies and the reverse arm assembly each comprising an outer cylinder diameter, the outer cylinder diameters each comprising spacer-bearing means, the spacer-bearing means for effecting evenly spaced roller movement intermediate the cylinder arm assemblies.

3. The transmission system of claim 2 comprising at least four support blocks, the support blocks being cooperatively associated with the cylinder arm assemblies and comprising an outer block diameter, the outer block diameters each comprising support-bearing means, the support bearing means for enabling evenly supported rotational cylinder movement about the support blocks, the support blocks for effecting coaxial rotational cylinder movement about the input axis of rotation.

4. The transmission system of claim 3 wherein the output arm ends each comprise rod-engaging rings, the rod-engaging rings interfacing intermediate the output arm ends and the second rod ends for enhancing rotational movement transmission intermediate the cylinder arm assemblies and the rod-translation system.

5. The transmission system of claim 4 wherein the second rod ends each comprise coned structure and the rod-engaging rings each comprise cone-receiving structure, the coned structure being matable with the cone-receiving structure for enhancing rotational movement transmission intermediate the cylinder arm assemblies and the rod-translation system.

6. The transmission system of claim 5 comprising a transmission housing, the transmission housing being sized and shaped to encase the cylinder arm assemblies, the rotation transmissive portion, the rotation receptive portion, the bearing means, the stepped ring, and the rods, the first input shaft end extending outwardly from the transmission housing for receiving engine-originated rotational motion, the second output shaft end extending outwardly from the transmission housing for imparting transmitted engine-originated rotational motion, the transmission housing being liquid impermeable for receiving liquid lubrication means, the liquid lubrication means for lubricating encased structure.

7. The transmission system of claim 6 wherein the rod-translating means are hydraulically-based, a hydraulic cylinder being cooperatively associated with each rod for imparting motion thereto, the hydraulic cylinders being fixedly positioned at the transmission housing and communicating with the rods via the bearing means for imparting motion thereto.

8. A transmission assembly, the assembly for transmitting rotational movement from a transmission input shaft to a transmission output shaft, the transmission assembly comprising:

an input shaft, the input shaft comprising an engine-engaging first input shaft end, a shaft-engaging second input shaft end, a rotation transmissive portion, and an input axis of rotation, the rotation transmissive portion extending intermediate the first and second input shaft ends for transferring engine-originated rotational motion to the transmission assembly via the first input shaft end;

at least two cylinder arm assemblies, the cylinder arm assemblies being concentric about the input axis of rotation and comprising a reverse arm assembly and a forward arm assembly, the cylinder arm assemblies each comprising an input arm end, an output arm end, and an inner arm diameter, the inner arm diameters for effecting varying gear ratios, the input arm ends each being independently geared to the rotation transmissive portion via the inner arm diameters, the rotation transmissive portion thereby enabling reverse rotational movement of the reverse arm assembly and forward rotational movement of the forward arm assembly;

an output shaft assembly, the output shaft assembly comprising an output shaft and a stepped ring, the output shaft comprising a shaft-engaging first output shaft end, a shaft-engaging second output shaft end, a rotation receptive portion, and an output axis of rotation, the rotation receptive portion extending intermediate the first and second output shaft ends, the stepped ring comprising a uniform inner diameter, at least two outer diameters, and a plurality of rod-receiving tunnels, the stepped ring receiving the rotation receptive portion at the inner diameter and being fixedly attached thereto, the rod-receiving tunnels being parallel to the output axis of rotation, the first output shaft end being rotatively mated with the second input shaft end, the output and input axes of rotation being coaxial, the input and output shafts being independently rotatable, the rod-receiving tunnels being rotatable about the output axis of rotation; and a rod-translation system, the rod-translation system comprising a plurality of rods, bearing means for movement, and rod-translating means, the rods being received in the rod-receiving tunnels and each comprising an arm-engaging first rod end and a bearing-engaging second rod end, select second rod ends being cooperatively associated with the bearing means, select bearing means being cooperatively associated with each cylinder arm assembly, the rod-translating means for selectively translating the bearing means and rods intermediate an arm-engaged position and an arm-disengaged position, select first rod ends engaging a select output arm end when in the arm-engaged position for imparting rotational movement from the select output arm end to the output shaft via the stepped ring, the bearing means enabling rotational movement of the output shaft relative to the rod-translating means, the transmission assembly thus for transmitting rotational movement from the input shaft to the output shaft.

9. The transmission assembly of claim 8 wherein the reverse arm assembly comprises an outer cylinder diameter, the outer cylinder diameter comprising spacer-bearing means, the spacer-bearing means for effecting evenly spaced roller movement intermediate the cylinder arm assemblies.

10. The transmission assembly of claim 8 comprising at least two support blocks, the support blocks being cooperatively associated with the cylinder arm assemblies and comprising an outer block diameter, the outer block diameters each comprising support-bearing means, the support bearing means for enabling evenly supported rotational cylinder movement about the support blocks, the support blocks for effecting coaxial rotational cylinder movement about the input axis of rotation.

11. The transmission assembly of claim 8 wherein the output arm ends each comprise rod-engaging rings, the rod-engaging rings interfacing intermediate the output arm ends and the second rod ends for enhancing rotational movement transmission intermediate the cylinder arm assemblies and the rod-translation system.

12. The transmission assembly of claim 11 wherein the second rod ends each comprise coned structure and the rod-engaging rings each comprise cone-receiving structure, the coned structure being matable with the cone-receiving structure for enhancing rotational movement transmission intermediate the cylinder arm assemblies and the rod-translation system.

13. The transmission assembly of claim 8 comprising a transmission housing, the transmission housing being sized and shaped to encase the cylinder arm assemblies, the rotation transmissive portion, the rotation receptive portion, the bearing means, the stepped ring, and the rods, the first input shaft end extending outwardly from the transmission housing for receiving engine-originated rotational motion, the second output shaft end extending outwardly from the transmission housing for imparting transmitted engine-originated rotational motion, the transmission housing being liquid impermeable for receiving liquid lubrication means, the liquid lubrication means for lubricating encased structure.

14. The transmission assembly of claim 13 wherein the rod-translating means are hydraulically-based, a hydraulic cylinder being cooperatively associated with each rod for imparting motion thereto, the hydraulic cylinders being fixedly positioned at the transmission housing and communicating with the rods via the bearing means for imparting motion thereto.

15. A transmission assembly, the transmission assembly for transmitting rotational movement from a transmission input shaft to a transmission output shaft, the transmission assembly comprising:
   an input shaft, the input shaft comprising an engine-engaging first input shaft end, a shaft-engaging second input shaft end, a rotation transmissive portion, and an input axis of rotation, the rotation transmissive portion extending intermediate the first and second input shaft ends for transferring engine-originated rotational motion to the transmission assembly via the first input shaft end;
   a cylinder arm assembly, the cylinder arm assembly comprising an input arm end and an output arm end, the input arm end each being geared to the rotation transmissive portion, the rotation transmissive portion thereby enabling rotational movement of the cylinder arm assembly;
   an output shaft assembly, the output shaft assembly comprising an output shaft and an annular member, the output shaft comprising a shaft-engaging first output shaft end, a shaft-engaging second output shaft end, a rotation receptive portion, and an output axis of rotation, the rotation receptive portion extending intermediate the first and second output shaft ends, the annular member comprising an inner diameter, an outer diameter, and a plurality of rod-receiving tunnels extending intermediate the inner and outer diameter, the annular member receiving the rotation receptive portion at the inner diameter and being fixedly attached thereto, the rod-receiving tunnels being parallel to the output axis of rotation, the first output shaft end being rotatively mated with the second input shaft end, the output and input axes of rotation being coaxial, the input and output shafts being independently rotatable, the rod-receiving tunnels being rotatable about the output axis of rotation; and
   a rod-translation system, the rod-translation system comprising a plurality of rods, a plurality of thrust bearings, and fixed rod-translating means, the rods being received in the rod-receiving tunnels and each comprising an arm-engaging first rod end and a bearing-engaging second rod end, the second rod ends being cooperatively associated with the bearing means, the rod-translating means for selectively translating the bearing means and rods intermediate an arm-engaged position and an arm-disengaged position, the first rod ends engaging the output arm end when in the arm-engaged position for imparting rotational movement from the output arm end to the output shaft by way of the annular member, the bearing means enabling rotational movement of the output shaft relative to the rod-translating means, the transmission assembly thus for transmitting rotational movement from the input shaft to the output shaft.

16. The transmission assembly of claim 15 comprising a support block, the support block being cooperatively associated with the cylinder arm assembly and comprising an outer block diameter, the outer block diameter comprising support-bearing means, the support bearing means for enabling evenly supported rotational cylinder movement about the support block, the support blocks for maintaining rotational cylinder movement about the input axis of rotation.

17. The transmission assembly of claim 15 wherein the output arm end comprises a rod-engaging ring, the rod-engaging ring interfacing intermediate the output arm end and the second rod ends for enhancing rotational movement transmission intermediate the cylinder arm assembly and the rod-translation system.

18. The transmission assembly of claim 17 wherein the second rod ends each comprise coned structure and the rod-engaging ring comprises cone-receiving structure, the coned structure being matable with the cone-receiving structure for enhancing rotational movement transmission intermediate the cylinder arm assembly and the rod-translation system.

19. The transmission assembly of claim 15 comprising a transmission housing, the transmission housing being sized and shaped to encase the cylinder arm assembly, the rotation transmissive portion, the rotation receptive portion, the bearing means, the annular member, and the rods, the first input shaft end extending outwardly from the transmission housing for receiving engine-originated rotational motion, the second output shaft end extending outwardly from the transmission housing for imparting transmitted engine-originated rotational motion, the transmission housing being liquid impermeable for receiving liquid lubrication means, the liquid lubrication means for lubricating encased structure.

20. The transmission assembly of claim 19 wherein the rod-translating means are hydraulically-based, a hydraulic cylinder being cooperatively associated with each rod for imparting motion thereto, the hydraulic cylinders being fixedly positioned at the transmission housing and communicating with the rods via the bearing means for imparting motion thereto.

* * * * *